(12) United States Patent
Choi et al.

(10) Patent No.: US 9,044,813 B2
(45) Date of Patent: Jun. 2, 2015

(54) TANGENTIAL CUTTING INSERT

(71) Applicant: TAEGUTEC LTD., Dalseong-gun, Daegu (KR)

(72) Inventors: Chang Hee Choi, Daegu (KR); Chang Gyu Park, Daegu (KR); Jae Wook Lee, Daegu (KR)

(73) Assignee: TaeguTec, Ltd., Daisung-gun, Daegu (KR)

( * ) Notice: Subject to any disclaimer, the term of this patent is extended or adjusted under 35 U.S.C. 154(b) by 90 days.

(21) Appl. No.: 13/946,854

(22) Filed: Jul. 19, 2013

(65) Prior Publication Data

US 2013/0302099 A1 Nov. 14, 2013

Related U.S. Application Data

(63) Continuation of application No. PCT/KR2011/009572, filed on Dec. 13, 2011.

(30) Foreign Application Priority Data

Jan. 27, 2011 (KR) .......................... 10-2011-0008310

(51) Int. Cl.
*B23C 5/02* (2006.01)
*B23C 5/20* (2006.01)
*B23C 5/08* (2006.01)

(52) U.S. Cl.
CPC ............... *B23C 5/207* (2013.01); *Y10T 407/23* (2015.01); *B23C 5/08* (2013.01); *B23C 5/202* (2013.01);
(Continued)

(58) Field of Classification Search
CPC .................... B23C 2200/12; B23C 2200/123; B23C 2200/203; B23C 2210/163; B23C 2210/206; B23C 2210/50; B23C 5/202; B23C 5/207; B23C 5/08
USPC ..................................................... 407/113, 42
See application file for complete search history.

(56) References Cited

U.S. PATENT DOCUMENTS 4,531,864 A 7/1985 Bylund
4,790,693 A * 12/1988 Koblesky ........................ 407/35
(Continued)

FOREIGN PATENT DOCUMENTS

CN 101439416 A 5/2009
EP 1072347 A2 1/2001
(Continued)

OTHER PUBLICATIONS

Official Action dated Apr. 22, 2014 issued in Japanese counterpart application (No. 2013-550385).
(Continued)

*Primary Examiner* — Daniel Howell
*Assistant Examiner* — Nicole N Ramos
(74) *Attorney, Agent, or Firm* — Womble Calyle

(57) ABSTRACT

A hexahedral insert has top and bottom faces and two pairs of opposing side faces with main cutting edges formed on the borders of the top and bottom faces to the side faces and a screw hole passing through each central portion of the top and bottom faces. The top and bottom faces are flat planes parallel to each other; each of the side faces consecutively from top to bottom includes an upper land portion, an upper inwardly-inclined portion, a flat support surface, a lower inwardly-inclined portion, and a lower land portion. Each of two adjacent side faces has a corner surface therebetween which forms corner edges on the borders to the top and bottom faces. The cutting insert enhances the cutting power by reducing cutting resistance and prevents scratches on a machined surface.

10 Claims, 2 Drawing Sheets

(52) U.S. Cl.
CPC ... *B23C 2200/0455* (2013.01); *B23C 2200/085* (2013.01); *B23C 2200/365* (2013.01); *B23C 2200/367* (2013.01); *B23C 2200/203* (2013.01)

(56) References Cited

U.S. PATENT DOCUMENTS

| | | | |
|---|---|---|---|
| 5,707,185 A | 1/1998 | Mizutani | |
| 6,238,146 B1* | 5/2001 | Satran et al. | 407/113 |
| 7,972,091 B2 | 7/2011 | Svenningsson et al. | |
| 8,702,353 B2* | 4/2014 | Chen et al. | 407/114 |
| 2004/0013478 A1* | 1/2004 | Dehn et al. | 407/113 |
| 2005/0249559 A1 | 11/2005 | Lof et al. | |
| 2006/0039763 A1 | 2/2006 | Lof et al. | |
| 2006/0165501 A1* | 7/2006 | Heinloth | 409/199 |
| 2006/0210364 A1 | 9/2006 | Bellmann et al. | |
| 2008/0273930 A1 | 11/2008 | Svenningsson et al. | |
| 2010/0150671 A1 | 6/2010 | Oprasic et al. | |
| 2011/0052337 A1* | 3/2011 | Dudzinsky et al. | 407/40 |
| 2011/0164932 A1* | 7/2011 | Choi et al. | 407/40 |
| 2012/0076596 A1* | 3/2012 | Kim | 407/69 |

FOREIGN PATENT DOCUMENTS

| | | |
|---|---|---|
| JP | 2004-223627 | 8/2004 |
| JP | 2008018515 A * | 1/2008 |
| JP | 2013121640 A * | 6/2013 |
| KR | 10 2010 0093236 | 8/2010 |
| KR | 10-2010-0130041 | 12/2010 |
| WO | WO 2009/157603 | 12/2009 |
| WO | WO 2010021463 A2 * | 2/2010 |

OTHER PUBLICATIONS

International Search Report dated Jul. 16, 2012 issued in PCT counterpart application (No. PCT/KR2011/009572).
Written Opinion dated Jul. 16, 2012 issued in PCT counterpart application (No. PCT/KR2011/009572).
Official Action dated Sep. 28, 2014 issued in Chinese counterpart application (No. 20118006601.0).
Extended search report dated Sep. 30, 2014 issued in European counterpart application (No. 11856971.4).

* cited by examiner

TANGENTIAL CUTTING INSERT

RELATED APPLICATIONS

This is a Continuation of International Patent Application No. PCT/KR2011/009572, filed 13-Dec.-2011, which published as WO 2012/102380A2 and claims priority to KR 10-2011-0008310, filed 27-Jan. 2011. The contents of the aforementioned applications are incorporated by reference in their entirety.

TECHNICAL FIELD

This disclosure is related to a tangential cutting insert to be mounted on a milling cutter.

BACKGROUND ART

Since milling generally employs a plurality of cutting inserts mounted on the lateral surface of a milling cutter for machining a workpiece, the cutting capability is markedly varied depending on the cutting depth and the shape of inserts.

Conventionally, deep grooves or surfaces were machined using a milling cutter with a plurality of square plate type cutting inserts mounted on its lateral surface. However, inserts of this shape cause a high cutting resistance, and is uneconomical due to fewer numbers of available cutting edges. In cases where a plurality of inserts is used, machining quality is deteriorated due to discontinuities in insert profile. Since a plurality of inserts is mounted in axial direction as well as in circumferential direction, inserts are mounted with cutting edges in an overlapped fashion in order not to leave unmachined portions in axial direction. Here, machined surface might have scratches over the overlapped portions by sharp edge corners. If corners of the cutting edges are damaged, the neighboring cutting edges are also damaged, and then the service life of the insert is shortened.

SUMMARY OF THE INVENTION

The present disclosure aims to provide a cutting insert that prevents scratches on the machined surface while milling a workpiece, has a low cutting resistance, and allows a low manufacture cost.

The present disclosure also aims to enhance the strength of the main cutting edges of the insert A hexahedral insert according to the present disclosure has top and bottom faces and two pairs of opposing side faces with main cutting edges formed on the borders of the top and bottom faces to the side faces and a screw hole passing through each central portion of the top and bottom faces, wherein the top and bottom faces are flat planes parallel to each other; each of the side faces consecutively from top to bottom includes an upper land portion, an upper inwardly-inclined portion, a flat support surface, a lower inwardly-inclined portion, and a lower land portion; and each of two adjacent side faces has a corner surface therebetween which forms corner edges on the borders to the top and bottom faces.

The upper inwardly-inclined portion and the lower inwardly-inclined portion of the insert according to the present disclosure are convexly curved surfaces.

The corner surface of the insert according to the present disclosure is a flat plane or a transversely-convex curved surface.

Each of the flat support surfaces of the insert according to the present disclosure is provided with an undercut in the middle.

Each of the main cutting edges of the insert according to the present disclosure has a central edge portion and outer edge portions positioned adjacent to the both outer sides of the central edge portion, wherein the radius of curvature of the outer edge portions is smaller than that of the central edge portion.

The insert according to this disclosure enhances the strength of the main cutting edges of the insert and also enhances cutting power by reducing cutting resistance. Especially, this disclosure has an effect of protecting exposed portions of the insert by controlling the cutting chips outwardly. Since the insert according to this disclosure does not require a high degree of mold punching precision, the manufacturing cost is much cheaper.

The insert according to this disclosure provides eight main cutting edges by symmetricity and allows an enhanced service life. The insert according to this disclosure prevents scratches on a machined surface of a workpiece and allows a stable milling process.

DETAILED DESCRIPTION

Hereinafter, detailed embodiments according to the present disclosure are described. However, the present invention can be realized in other various forms, and is not limited to the embodiments explained herein. The figures attached to the present disclosure are merely for convenience of explanation, and the shapes and the relative scales may be exaggerated or distorted. Some portions of the figures which are not necessary for explaining the features of the present invention may be abridged for clearer explanation of the invention.

Figures 1, 2, 3:
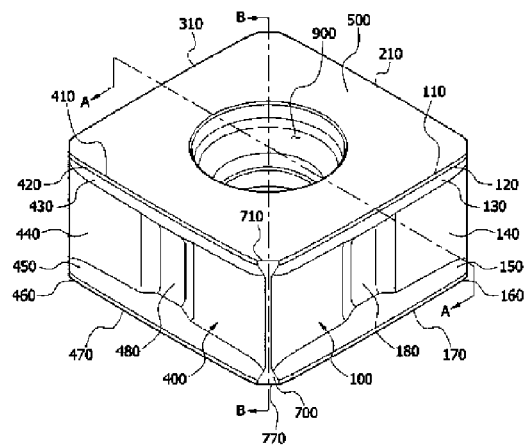
FIG. 1 is a perspective view of an insert in accordance with the present disclosure.
FIG. 2 is a perspective view of a milling cutter mounted with inserts in accordance with the present disclosure.
FIG. 3 is a cross sectional view of an insert cut through line A-A of FIG. 1.

FIG. 1 is a perspective view of an insert in accordance with the present disclosure. These inserts are called tangential inserts, since they are mounted in a tangential orientation on a milling cutter by screws as shown in FIG. 2.

An insert of the present disclosure is hexahedral with a top face 500, a bottom face 600, and two pairs of opposing side faces 100,200,300,400. Main cutting edges 110,170,410,470 are formed on the borders of the top face 500 and bottom face 600 to the side faces 100,200,300,400. A screw hole 900 passes through each central portion of the top and bottom faces 500,600.

The top face 500 and the bottom face 600 are flat planes parallel to each other. One face of the insert facing workpieces is called the top face while the other face facing the milling cutter is called the bottom face depending on the mounting orientation, but the top and bottom faces are not distinct from each other by their shapes.

Each of the side faces is shaped concavely and has, consecutively from top to bottom, an upper land portion 120,420, an upper inwardly-inclined portion 130,430, a flat support surface 140,440, a lower inwardly-inclined portion 150,450, and a lower land portion 160,460. Each of the flat support surfaces 140,440 is provided with an undercut 180,480 in the middle. The shape of side faces 100,200,300,400 is more clearly depicted by a cross sectional view and a detail view in FIG. 3, which is cut through undercuts 180 by line A-A of FIG. 1. The upper inwardly-inclined portion 130 and lower inwardly-inclined portion 150 are convexly curved (R2) surfaces.

The flat support surfaces 140,440 are contacted by wall surfaces of the pockets of a milling cutter on mounting and convey a tangential component of rotation force. The undercuts 180,480 of the flat support surfaces 140,440 help an accurate and stable mounting of an insert into the pockets of a milling cutter.

The upper land portions 120,420 enhance the strength of the main cutting edges 110,210,310,410 of this tangential insert. The upper inwardly-inclined portion 130 enhances the cutting power by reducing cutting resistance during machining. Especially, convexly curved surfaces R2 of the upper inwardly-inclined portions 130 has an effect of protecting exposed flat support surfaces 140,440 and undercuts 180,480 of an insert by controlling the cutting chips outwardly.

Figure 4:
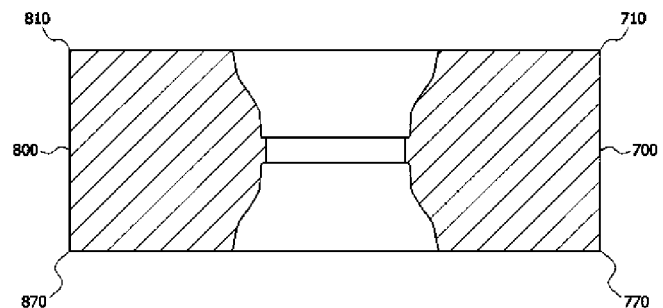
FIG. 4 is a cross sectional view of an insert cut through line B-B of FIG. 1.

Each of two adjacent side faces has a corner surface therebetween, which forms corner edges 710,770,810,870 on the borders to the top and bottom faces 500,600. FIG. 4 is a cross sectional view cut through diagonally opposing corner surfaces 700,800 by line B-B of FIG. 1. As shown in FIG. 4, the corner surfaces 700,750,800,850 can be either flat surfaces or transversely convex-curved surfaces which are perpendicular to the top face 500 and the bottom face 600. These corner surfaces 700,750,800,850 can be easily formed by grinding which is performed after an insert is punched by molding. Therefore, since this manufacturing method does not require a high degree of punching precision, the manufacturing cost of this type of inserts can be reduced drastically.

Since the insert of the present disclosure is preferably symmetrical in three directions, eight main cutting edges are available for use.

Figure 5:
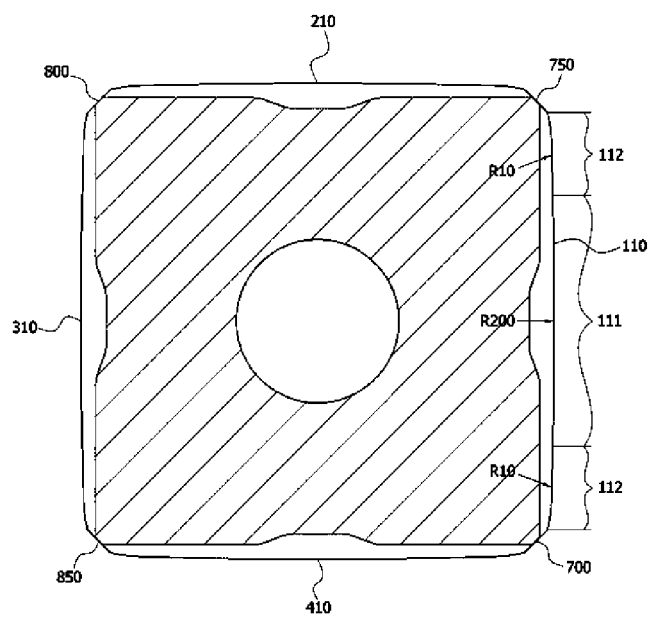
FIG. 5 is a planar cross section view of an insert in accordance with the present disclosure.
Figure 6:
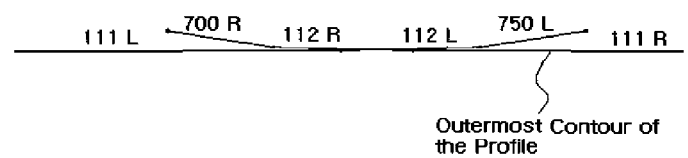
FIG. 6 is an overlapped profile of inserts in accordance with the present disclosure.

As shown in FIG. 5, each of the main cutting edges 110 may have a central edge portion 111 and outer edge portions 112 which are positioned adjacent to the both outer sides of the central edge portion 111, wherein the radius of curvature (R10) of the outer edge portions 112 is smaller than that (R200) of the central edge portion 111. If the radius of curvature of the central edge portion 111 is infinite, the central edge portion 111 becomes a straight line type. Since the radius of curvature of the outer edge portions 112 is smaller and corner edges 710,770,810,870 exist, machined surface of a workpiece are free from scratch by sharp corners and more stable milling is allowed. In other words, as a milling cutter rotates, a profile of overlapped cutting edges can be drawn as in FIG. 6. As shown in FIG. 6, a central edge portion 111L of a left insert and another central edge portion 111R of a right insert form a outermost contour, and outer edge portions 112L,112R and corner edges 700R,750L are withdrawn from the outermost contour, scratches by corners can be prevented. In addition, since this structure does not cause damages on inactive main cutting edges, all the eight main cutting edges are available for use, and the service life is much enhanced.

The invention disclosed above may have various other embodiments without departing from the basic concept of the present disclosure. Accordingly, all the disclosed embodiments must be understood as being exemplary only and must not be construed to be the limit of the present disclosure. Accordingly, the range of protection for the present disclosure must be determined not by an embodiment described hereinabove, but by the attached claims. An alternative that is equivalent to the attached claims is included in the range of protection of the attached claims.

Description Of Reference Numerals
- 100,200,300,400: side face
- 110,210,310,410: main cutting edge
- 111: central edge portion
- 112: outer edge portion
- 120,420: upper land portion
- 130,430: upper inwardly-inclined portion
- 140,440: flat support surface
- 150,450: lower inwardly-inclined portion
- 160,460: lower land portion
- 180,480: undercut
- 500: top face
- 600: bottom face
- 710,770,810,870: corner edge
- 700,750,800,850: corner surface
- 900: screw hole

What is claimed is:

1. A hexahedral insert having top and bottom faces and two pairs of opposing side faces with main cutting edges formed on the borders of the top and bottom faces to the side faces and a screw hole passing through each central portion of the top and bottom faces, wherein
   the top and bottom faces are flat planes parallel to each other, with the main cutting edges being located on said flat planes;
   each of the side faces consecutively from top to bottom includes an upper land portion, an upper inwardly-inclined portion, a flat support surface, a lower inwardly-inclined portion, and a lower land portion; and
   each of two adjacent side faces has a corner surface therebetween which forms corner edges on the borders to the top and bottom faces.

2. The insert as claimed in claim 1, wherein the upper inwardly-inclined portion and the lower inwardly-inclined portion are convexly curved surfaces.

3. The insert as claimed in claim 1, wherein the corner surface is a flat plane or a transversely convex-curved surface.

4. The insert as claimed in claim 1, wherein each of the flat support surfaces is provided with an undercut in the middle.

5. The insert as claimed in claim 1, wherein each of the main cutting edges has a central edge portion and outer edge portions positioned adjacent to the both outer sides of the central edge portion, wherein the radius of curvature of the outer edge portions is smaller than that of the central edge portion.

6. The insert as claimed in claim 1, wherein:
   the upper inwardly-inclined portion and the lower inwardly-inclined portion are convexly curved surfaces;
   the corner surface is a flat plane or a transversely convex-curved surface;
   each of the flat support surfaces is provided with an undercut in the middle; and
   each of the main cutting edges has a central edge portion and outer edge portions positioned adjacent to the both outer sides of the central edge portion, wherein the radius of curvature of the outer edge portions is smaller than that of the central edge portion.

7. The insert as claimed in claim 3, wherein the corner surface connects two adjacent flat support surfaces.

8. The insert as claimed in claim 7, wherein each of the main cutting edges has a central edge portion and outer edge portions positioned adjacent to the both outer sides of the central edge portion, wherein the radius of curvature of the outer edge portions is smaller than that of the central edge portion.

9. A hexahedral insert having top and bottom faces and two pairs of opposing side faces with main cutting edges formed on the borders of the top and bottom faces to the side faces and a screw hole passing through each central portion of the top and bottom faces, wherein
- the top and bottom faces are flat planes parallel to each other;
- each of the side faces consecutively from top to bottom includes an upper land portion, an upper inwardly-inclined portion, a flat support surface, a lower inwardly-inclined portion, and a lower land portion;
- each of two adjacent side faces has a corner surface therebetween which forms corner edges on the borders to the top and bottom faces
- the corner surface is a flat plane or a transversely convex-curved surface, which connects two adjacent flat support surfaces; and
- each of the main cutting edges has a central edge portion and outer edge portions positioned adjacent to the both outer sides of the central edge portion, wherein the radius of curvature of the outer edge portions is smaller than that of the central edge portion.

10. A hexahedral insert having top and bottom faces and two pairs of opposing side faces with main cutting edges formed on the borders of the top and bottom faces to the side faces and a screw hole passing through each central portion of the top and bottom faces, wherein
- the top and bottom faces are flat planes parallel to each other;
- each of the side faces consecutively from top to bottom includes an upper land portion, an upper inwardly-inclined portion, a flat support surface, a lower inwardly-inclined portion, and a lower land portion;
- each of two adjacent side faces has a corner surface therebetween which forms corner edges on the borders to the top and bottom faces
- the upper inwardly-inclined portion and the lower inwardly-inclined portion are convexly curved surfaces;
- the corner surface is a flat plane or a transversely convex-curved surface, which connects two adjacent flat support surfaces;
- each of the flat support surfaces is provided with an undercut in the middle; and
- each of the main cutting edges has a central edge portion and outer edge portions positioned adjacent to the both outer sides of the central edge portion, wherein the radius of curvature of the outer edge portions is smaller than that of the central edge portion.

* * * * *